US006867726B1

United States Patent
Yu et al.

(10) Patent No.: US 6,867,726 B1
(45) Date of Patent: Mar. 15, 2005

(54) COMBINING SIDELOBE CANCELLER AND MAINLOBE CANCELLER FOR ADAPTIVE MONOPULSE RADAR PROCESSING

(75) Inventors: Kai-Bor Yu, Schenectady, NY (US); David Jay Murrow, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1826 days.

(21) Appl. No.: 07/807,548

(22) Filed: Dec. 16, 1991

(51) Int. Cl.[7] .............................................. G01S 13/36
(52) U.S. Cl. ....................... 342/17; 342/149; 342/379
(58) Field of Search ........................... 342/16, 17, 149, 342/379

(56) References Cited

U.S. PATENT DOCUMENTS

| | | | | |
|---|---|---|---|---|
| 5,045,858 A | * | 9/1991 | Eberhardt et al. | 342/379 |
| 5,245,347 A | * | 9/1993 | Bonta et al. | 342/149 |
| 5,311,192 A | * | 5/1994 | Varga et al. | 342/188 |
| 5,359,329 A | * | 10/1994 | Lewis et al. | 342/17 |
| 5,600,326 A | * | 2/1997 | Yu et al. | 342/17 |

OTHER PUBLICATIONS

Y.T. Lo et al., "Antenna Handbook, Theory, Application, and Design", Van Nostrand Reinhold Co., N.Y. (1988), Chapter 13.
R.C. Davis et al., "Angle Estimation with Adaptive Arrays in External Noise Field", IEEE Trans. on Aerospace and Electronic Systems, vol. AES–12, No. 2, Mar. 1976.
R.R. Kinsey, "Monopulse Difference Slope and Gain Standards", IRE Trans., vol. AP–10, pp. 343–344, May 1962.
C.R. Clark, "Main Beam Jammer Cancellation and Target Angle Estimation with a Polarization–Agile Monopulse Antenna", 1989 IEEE Radar Conference, Mar. 29–30, 1989, Dallas, TX, pp. 95–100.
S.P. Applebaum et al., "Main Beam Jammer Cancellation for Monopulse Sensors", Final Tech. Report DTIC RADC–TR–86–267, Dec., 1984.
P.W. Howells, "Exploration in Fixed and Adaptive Resolution at GE and SURC", IEEE Trans. on Antennas and Propagation, vol. AP–24, No. 5, Sep. 1976, p. 575.
S.P. Applebaum, "Adaptive Arrays", Syracuse University Research Corporation, TR 66–001, Aug. 1966 (Revised Mar. 1975).
S.P. Applebaum, "Adaptive Arrays", IEEE Transactions on Antennas and Propagation, vol. AP–24, No. 5, Sep. 1976, pp. 585–598.

(List continued on next page.)

Primary Examiner—John B. Sotomayor
(74) Attorney, Agent, or Firm—Duane Morris LLP

(57) ABSTRACT

An improvement in monopulse radar achieves nulling of a single mainlobe jammer and multiple sidelobe jammers while maintaining the angle measurement accuracy of the monopulse ratio by cascading a multiple sidelobe canceller and a mainlobe canceller, and imposing a mainlobe maintenance technique during the sidelobe jammer cancellation process so that the results of the sidelobe jammer cancellation process do not distort the subsequent mainlobe cancellation process. In this manner, the sidelobe jammers and the mainlobe jammer are cancelled sequentially in separate processes.

6 Claims, 9 Drawing Sheets

OTHER PUBLICATIONS

Widrow et al., "Adaptive Antenna Systems", Proc. IEEE, vol. 55, Dec. 1967, pp. 2143–2159.

K. Jablon, "Steady State Analysis of the Generalized Sidelobe Canceler by Adaptive Noise Cancelling Techniques", IEEE Trans. on Antennas and Propagation, vol. AP–34, pp. 330–337, Mar. 1986.

H. Cox et al., "Robust Adaptive Beamforming", IEEE Trans. on Acoustics, Speech and Signal Processing, vol. ASSP–35, Oct. 1987, pp. 1365–1375.

B. Widrow et al., "Signal Cancellation Phenomena in Adaptive Arrays: Causes and Cures", IEEE Trans. on Antennas and Propagation, vol. AP–30, May 1982, pp. 469–478.

T. Shan et al., "Adaptive Beamforming for Coherent Signals and Interference", IEEE Trans. on Acoustics, Speech and Signal Processing, vol. ASSP–33, Jun. 1985, pp. 527–536.

L. Haupt, "Simultaneous Nulling in the Sum and Difference Patterns of a Monopulse Antenna", IEEE Trans. on Antennas and Propagation, vol. AP–32, No. 5, May 1984, pp. 486–493.

L. Haupt, "Adaptive Nulling in Monopulse Antennas", IEEE Trans. on Anetnnas and Propagation, vol. 36, No. 2, Feb. 1988, pp. 202–208.

B. Vu, "Simultaneous Nulling in Sum and Difference Patterns by Amplitude Control", IEEE Trans. on Antennas and Propagation, vol. 34, No. 2, Feb. 1986.

* cited by examiner

COMBINING SIDELOBE CANCELLER AND MAINLOBE CANCELLER FOR ADAPTIVE MONOPULSE RADAR PROCESSING

RELATED APPLICATIONS

This application is related to Yu and Murrow application Ser. No. 07/807,546 now U.S. Pat. No. 5,600,326 filed concurrently herewith and assigned to the instant assignee.

BACKGROUND OF THE INVENTION

This invention generally relates to radar techniques for determining angular location of a target and, more particularly, to an improvement in the monopulse technique so as to maintain accuracy of the monopulse ratio in the presence of simultaneous jamming from multiple sidelobe jammers and a single mainlobe jammer.

The monopulse technique is a radar technique in which the angular location of a target can be determined within fractions of a beamwidth by comparing measurements received by two or more simultaneous beams. This technique for direction of arrival (DOA) estimation of a target is widely employed in modern surveillance and tracking radar. See, for example, D. K. Barton, "Modern Radar Systems Analysis," *Artech House* (1988), M. Sherman, "Monopulse Principles and Techniques," *Artech House* (1988), and I. Leanov and K. I. Fomichev, "Monopulse Radar," *Artech House* (1986). In a typical phased array or digital beamforming (DBF) radar, one beam is formed in transmission and two beams are formed on reception for angle measurement.

The monopulse technique may be implemented for a linear array of N antenna elements which provide respective signals x(0), ..., x(N−1) to the beamforming network from the elemental receivers. The output signals of the beamforming network are the sum, Σ, and difference, Δ, signals which are processed in a processor to generate an output signal, θ, representing the direction of arrival estimation.

In the beamforming network, each of N input signals is split into two paths, linearly weighted, and then added together. The sum Σ and difference Δ signals may be expressed in the form $$\Sigma = \underline{W}_\Sigma^H \underline{x} \qquad (1)$$

$$\Delta = \underline{W}_\Delta^H \underline{x} \qquad (2)$$

respectively, where $W_\Sigma$ is real and even weighting, $W_\Delta$ is purely imaginary and odd weighting, H indicates the complex conjugate transpose and x is the vector of the measurements. When there is no jamming, Taylor and Bayliss weightings are typically used for sum beams and difference beams, respectively, so as to have a narrow mainlobe and low sidelobes. In the presence of jamming, the weights are adapted so as to form nulls responsive to the jammers. The quiescent Taylor and Bayliss weightings are designed for reducing the sidelobes in a practical system. See Y. T. Lo and S. W. Lee, "Antenna Handbook," *Theory, Applications, and Design*, Van Nostrand Reinhold Company, New York (1988), Chapter 13.

In a typical antenna pattern, the mainlobe of the pattern is a central beam surrounded by minor lobes, commonly referred to as sidelobes. Typically, it is desired to have a narrow mainlobe, high gain and low sidelobes so that the desired target within the mainlobe is enhanced and the response to clutter and jamming outside the mainlobe is attenuated. The sidelobe levels of an antenna pattern can be described in any of several ways. The most common expression is the relative sidelobe level, defined as the peak level of the highest sidelobe relative to the peak level of the main beam. Sidelobe levels can also be quantified in terms of their absolute level relative to isotropic.

The term "monopulse" refers to the fact that the echo from a single transmitter pulse returning from a target is used to measure the angle of the target, and typically, one beam (instead of two beams) is formed in transmission, and two beams are formed on reception for angle measurement. The sum beam pattern has a symmetrical amplitude profile with its maximum at the boresight, and the difference beam pattern has an antisymmetrical amplitude profile with zero response at the boresight. The DOA of a target signal can be determined accurately through a look-up table by evaluating the monopulse ratio, i.e., the real part of Δ/Σ. In fact, for a noiseless case and for uniform weighting, the monopulse ratio is exactly given by $$f(\theta) = \frac{\Delta(\theta)}{\Sigma(\theta)} = \tan\left(\pi T \frac{Nd}{2\lambda}\right) \qquad (3)$$

where T=sin(θ) and θ is the desired DOA, d is the array element spacing, N is the number of sensor elements, and λ is the wavelength. This equation enables T and the corresponding θ to be determined exactly. In the presence of noise, the development of the DOA maximum likelihood estimator also leads naturally to monopulse processing using sum and difference beams. See R. C. Davis, L. E. Brennan, and I. S. Reed, "Angle Estimation with Adaptive Arrays in External Noise Field," *IEEE Trans. on Aerospace and Electronic Systems*, Vol. AES-12, No. 2, March 1976. For zero-mean noise, the estimator is unbiased with mean square error (MSE) given by $$MSE = \frac{1}{2k^2 N \; SNR} \qquad (4)$$

where $$k = \left(\frac{\dot{f}^2 |g(T)|^2}{1+f^2}\right)^{\frac{1}{2}},$$

which is known to be the monopulse sensitivity factor, f is the monopulse function, and $\dot{f}$ is the derivative of f. SNR is the signal-to-noise ratio at the elemental level, and g(T) is the two-way sum beam antenna pattern.

Various authors have defined the monopulse sensitivity factor in different ways (see R. R. Kinsey, "Monopulse Difference Slope and Gain Standards," *IRE Trans.*, Vol AP-10, pp. 343-344, May 1962). In this application, the monopulse sensitivity factor is defined as the constant of proportionality required in the denominator of the root-mean-square-error (RMSE) to convert the square root of twice the boresight signal-to-noise ratio in the beam to RMSE. Defined in this manner, the monopulse sensitivity factor has the desirable property of containing all target angle-of-arrival information. See D. J. Murrow, "Height Finding and 3D Radar," Chapter 20, Radar Handbook (2nd Edition), McGraw-Hill.

This technique can also be considered for a planar array where the target azimuth and elevation angles are desired. In this setup, a set of sum ($\Sigma_e$) and difference ($\Delta_e$) beams are formed along the elevation axis with input signals from each column of sensors. The $\Sigma_e$ beams are then linearly combined in a row beamformer 63 to form the sum ($\Sigma = \Sigma_a \Sigma_e$) and difference ($\Delta_A = \Delta_a \Delta_e$) beams along the azimuth axis, where $\Sigma_a$ and $\Delta_a$ are the effective row sum beam and row difference beam, respectively. Similarly, the $\Delta_e$ beams are linearly combined in a row beamformer 64 to form the sum ($\Delta_E = \Sigma_a \Delta_e$) and difference ($\Delta_A = \Delta_a \Delta_e$) beams along the azimuth axis. Monopulse ratios along azimuth or elevation direction can then be formed giving the azimuth and elevation DOA estimates by using the following equations:

$$f_a(\theta_a) = \frac{\Delta_A}{\Sigma} = \frac{\Delta_a \Sigma_e}{\Sigma_a \Sigma_e} = \frac{\Delta_a}{\Sigma_a} \text{ and} \tag{5}$$

$$f_e(\theta_e) = \frac{\Delta_E}{\Sigma} = \frac{\Sigma_a \Delta_e}{\Sigma_a \Sigma_e} = \frac{\Delta_e}{\Sigma_e}. \tag{6}$$

These derivations make use of the separable property of the planar array patterns.

The monopulse technique for DOA estimation fails when there is sidelobe jamming (SLJ) and/or mainlobe jamming (MLJ). If not effectively countered, electronic jamming prevents successful radar target detection and tracking. The situation is exacerbated by introduction of stealth technology to reduce the radar cross section (RCS) of unfriendly aircraft targets. The frequency dependence of the RCS encourages use of lower microwave frequency bands for detection. This leads to large apertures to achieve angular resolution. Large apertures to achieve small beamwidth results in interception of more jamming. On the other hand, constrained apertures lead to wider beamwidth, which implies interception of more mainlobe jamming.

Heretofore, no viable or practical technique for cancelling simultaneous mainlobe and sidelobe jammers has been developed or fielded in a radar. This makes the conception and development of such technique one of the more pressing and critical issues facing radar today. The challenge is to develop adaptive beamforming architectures and signal processing algorithms to cancel mainlobe and sidelobe jammers while maintaining target detection and angle estimation accuracy on mainlobe targets.

Clark (see C. R. Clark, "Main Beam Jammer Cancellation and Target Angle Estimation with a Polarization-Agile Monopulse Antenna," 1989 *IEEE Radar Conference*, March 29-30, 1989, Dallas, Tex., pp. 95-100) addresses the problem of simultaneous mainlobe and sidelobe jamming cancellation but his work is distinguished from the present invention in three respects. First, Clark does not include the requirement of maintaining the monopulse ratio. Second, his approach uses the main array and sidelobe auxiliary array simultaneously. Third, as a consequence of using the arrays simultaneously, Clark's approach does not include mainlobe maintenance, thereby introducing distortion into the main beam.

SUMMARY OF THE INVENTION

It is therefore an object of the invention to cancel both mainlobe and sidelobe jammers while maintaining target detection and angle estimation accuracy on mainlobe targets.

More specifically, it is an object of the invention to combine cancellation techniques for multiple sidelobe jamming and mainlobe jamming in such a way that the monopulse accuracy for DOA estimation is maintained for mainlobe targets.

According to the invention, a multiple sidelobe jamming cancellation technique is cascaded with a mainlobe jamming cancellation technique. In the first stage of this process, the sidelobe jammer is cancelled by subtracting from the main beam a weighted sum of elements of the auxiliary array, and the main beam is maintained. In the second stage, the mainlobe cancellation is applied to cancel the mainlobe jammer while preserving the monopulse ratio. The beams from the first step are adapted using Applebaum's orthogonal nulling technique to cancel the mainlobe jammer along each axis while forming the monopulse ratio in the other axis. (See S. P. Applebaum and R. Wasiewicz, *Main Beam Jammer Cancellation for Monopulse Sensors*, Final Tech. Report DTIC 25. RADC-TR-86-267, December, 1984.)

It is essential to include an appropriate mainlobe maintenance (MLM) technique in the first stage to prevent an adverse interaction between the two techniques. The MLM prevents the multiple sidelobe cancelling technique from interfering with the mainlobe cancellation technique.

Thus the jammers are nulled before the receiver beamforming network employed in the known monopulse technique forms, at its output, the sum and difference beams for monopulse processing. The sidelobe jamming is suppressed using the auxiliary array inputs. The gain of the auxiliary elements is so low relative to the gain of the main antennas that the effect of the auxiliary elements may be ignored in determining the monopulse ratio, thus maintaining the sensitivity of the monopulse ratio as described, infra.

BRIEF DESCRIPTION OF THE DRAWINGS

The foregoing and other objects, aspects and advantages will be better understood from the following detailed description of a preferred embodiment of the invention with reference to the drawings, in which:

FIG. 13A is a block diagram of a modification of the architecture of the invention shown in FIG. 13.

DETAILED DESCRIPTION

Figure 1:
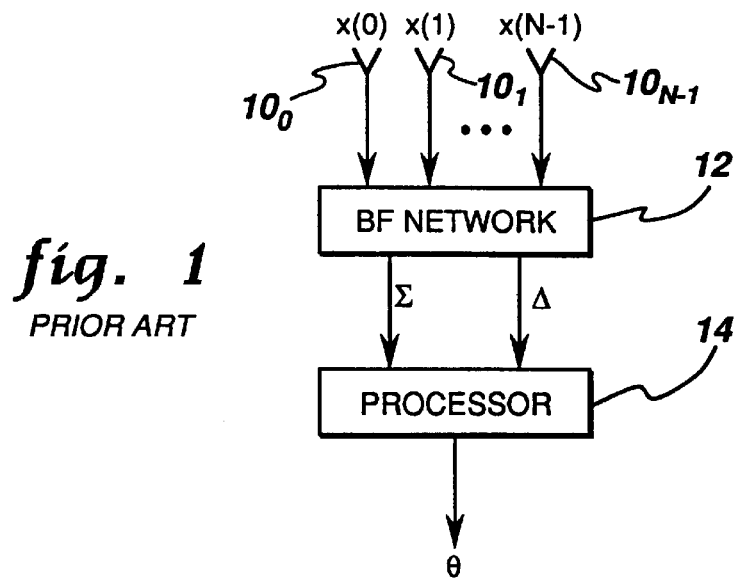
FIG. 1 is a block diagram showing a monopulse beamforming network for estimating direction of arrival.

A monopulse technique for DOA estimation is implemented for a linear array of antenna elements $10_0$ to $10_{N-1}$ which provide respective signals x(0), . . . , x(N−1), shown in FIG. 1, to the beamforming (BF) network 12 for combining the input signals from the elemental receiver. The output signals of BF network 12 are the sum Σ and difference Δ signals which are processed in a processor 14 to generate an output signal θ representing the direction of arrival estimation.

Figure 2:
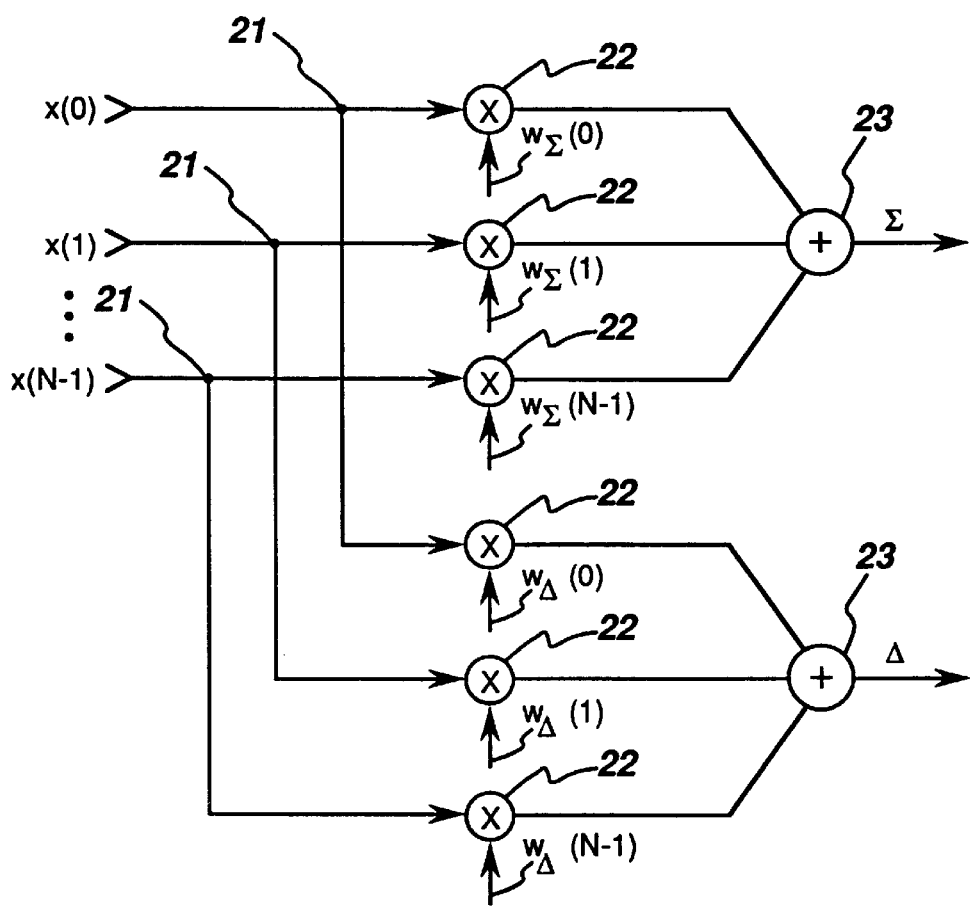
FIG. 2 is a detailed block diagram of a beamforming network.

Beamforming network 12 is more fully illustrated in FIG. 2 and comprises voltage splitters 21, weighting networks 22 and adders 23. Each of the N input signals is split into two paths which are linearly weighted, and in each of the two paths the N signals are added together.

The sum Σ and difference Δ signals are given by equations (1) and (2) as $$\Sigma = \underline{W}_\Sigma^H \underline{x} \qquad (1)$$

$$\Delta = \underline{W}_\Delta^H \underline{x} \qquad (2)$$

respectively. When there is no jamming, Taylor and Bayliss weightings are typically used for sum beams and difference beams, respectively, so as to have a narrow mainlobe and low sidelobes. In the presence of jamming, the weights are adapted so as to form nulls responsive to the jammers. The quiescent Taylor and Bayliss weightings are designed for reducing the sidelobes in a practical system.

Figure 3:
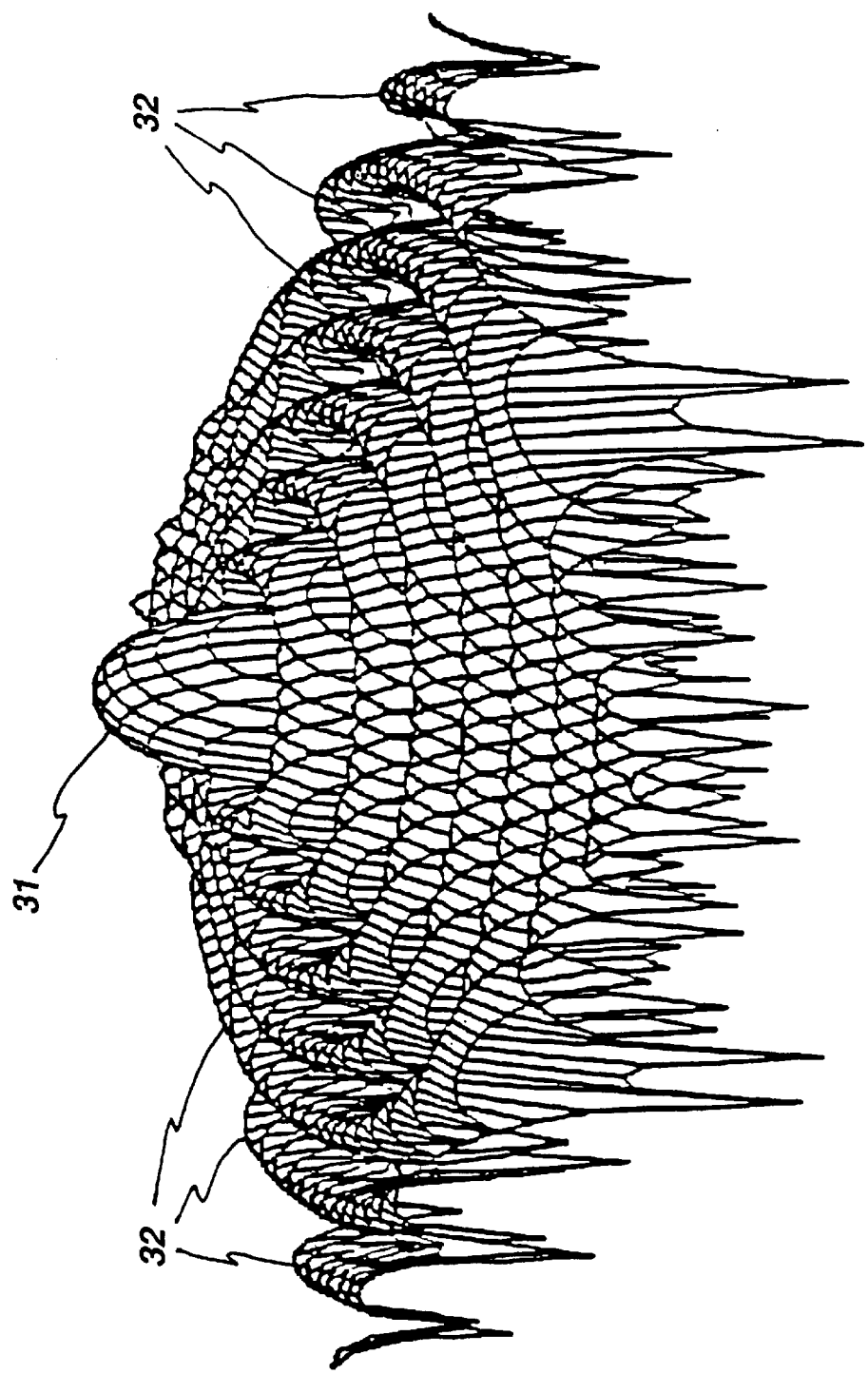
FIG. 3 is a perspective view of a monopulse radar sum beam antenna pattern.

FIG. 3 represents a typical sum beam antenna pattern. X The mainlobe of the pattern is a central beam 31 surrounded by minor lobes 32, or sidelobes. Typically, it is desired to have a narrow mainlobe, high gain and low sidelobes so that the desired target within the mainlobe is enhanced and the response to clutter and jamming outside the mainlobe is attenuated.

Figure 4:
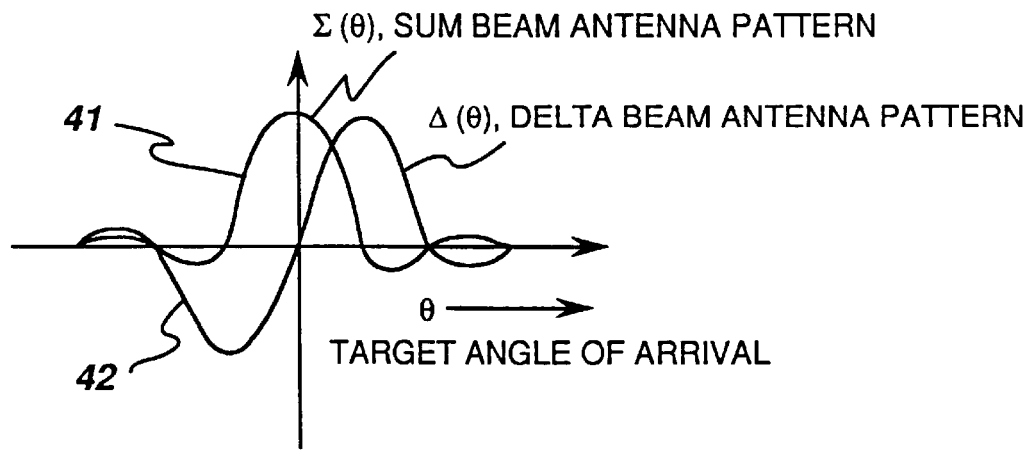
FIG. 4 is a graph of sum and difference beam patterns for monopulse antennas.
Figure 5:
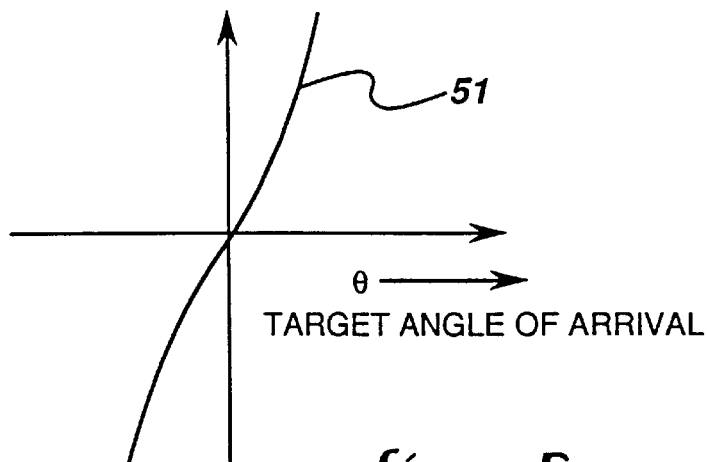
FIG. 5 is a graph of the monopulse ratio.

In the monopulse technique, typically one beam (instead of two beams) is formed in transmission, and two beams are formed on reception for angle measurement. As shown in FIG. 4, the sum beam 41 has a symmetrical amplitude profile with its maximum at the boresight, and the difference beam 42 has an antisymmetrical amplitude profile with zero response at the boresight. The DOA of a target signal can be determined accurately through a look-up table by evaluating the monopulse ratio 51, i.e., the real part of Δ/Σ, as shown in FIG. 5. For a noiseless case and for uniform weighting, the monopulse ratio is exactly given by equation (3) as $$f(\theta) = \frac{\Delta(\theta)}{\Sigma(\theta)} = \tan\left(\pi T \frac{Nd}{2\lambda}\right). \qquad (3)$$

Since T=sin (θ), T and the corresponding θ can be determined exactly. For zero-mean noise, the DOA maximum likelihood estimator is unbiased with mean square error (MSE) given by equation (4) as $$MSE = \frac{1}{2k^2 N\ SNR} \qquad (4)$$

where $$k^2 = \frac{\dot{f}^2 |g(T)|^2}{1+f^2},$$

is the monopulse sensitivity factor, which contains all target angle-of-arrival information.

Figure 6:
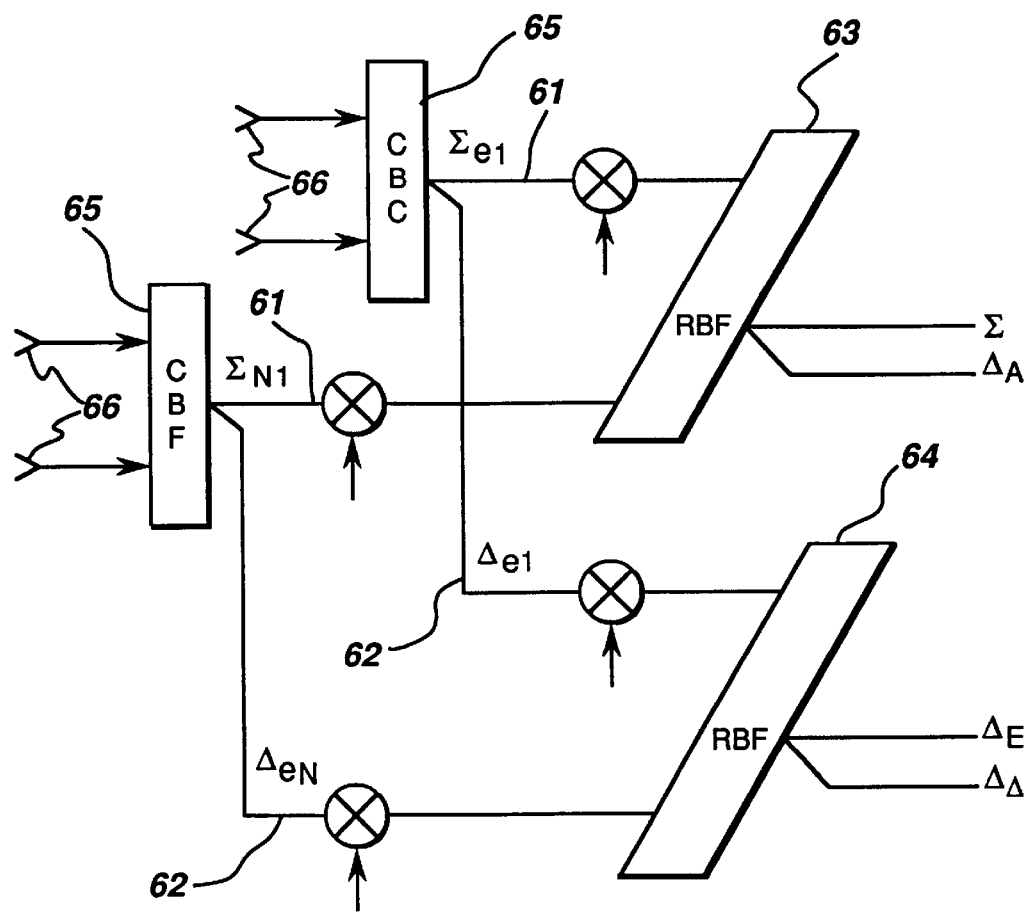
FIG. 6 is a block diagram of a monopulse radar.

This technique can also be used with a planar array where the target azimuth and elevation angles are desired, as shown in FIG. 6. In this setup, a set of sum ($\Sigma_e$) and difference ($\Delta_e$) beams are formed along the elevation axis with input signals from each column of sensors 66 by respective column beamformers 65. The $\Sigma_e$ beams may be appropriately Taylor and Bayliss weighted and then linearly combined in a row beamformer 63 to form the sum ($\Sigma = \Sigma_a \Sigma_e$) and difference ($\Delta_A = \Delta_a \Sigma_e$) beams along the azimuth axis. Similarly, the $\Delta_e$ beams may be appropriately Taylor and Bayliss weighted and then linearly combined in a row beamformer 64 to form the sum ($\Delta_E = \Sigma_a \Delta_e$) and difference ($\Delta_\Delta = \Delta_a \Delta_e$) beams along the azimuth axis. Monopulse ratios along azimuth or elevation direction can then be formed giving the azimuth and elevation DOA estimates by using equations (5) and (6), which take advantage of the separable property of the planar array patterns.

The present invention concerns cancellation of one mainlobe jammer and multiple sidelobe jammers in a way that provides target detection and enables unbiased monopulse angle measurement. In order to show the motivation for the present invention, some existing approaches for jammer cancellation are reviewed: the multiple sidelobe canceller (MSLC) (see P. W. Howells, "Exploration in Fixed and Adaptive Resolution at GE and SURC", *IEEE Trans. on Antennas and Propagation*, AP-24, No. 5 (September 1976), p. 575); the sum-difference mainlobe canceller (MLC) (see S. P. Applebaum and R. Wasiewicz, "Main Beam Jammer Cancellation for Monopulse Sensors", *Final Tech. Report DTIC RADC-TR*-86-267, December 1984); and the adaptive array (see S. P. Applebaum, "Adaptive Arrays", *Syracuse Univ. Research Corp., Report SPL*-769, June 1964 and Widrow, et al., "Adaptive Antenna Systems", *Proc. IEEE*, Vol. 55, December 1967).

Multiple Sidelobe Canceller (MSLC)

Figure 10:
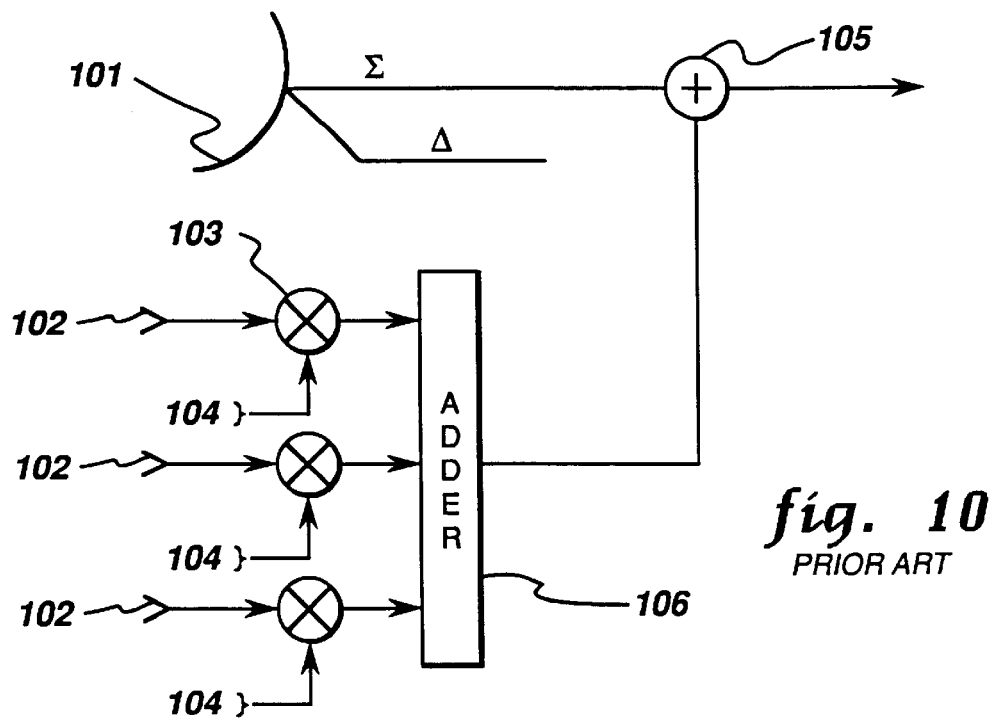
FIG. 10 is a schematic diagram showing a multiple sidelobe canceller for sum and difference channels.

The sidelobe canceller was actually the first type of adaptive antenna system to be deployed. It is used to reduce clutter and interference in radar systems and comprises a single high-gain antenna to which a number of small auxiliary elements are added. Both sum (Σ) and difference (Δ) channels are required for monopulse processing, as illustrated in FIG. 10. The high gain antenna 101 is a typical radar antenna (e.g., a parabolic dish) with a narrow beamwidth. The auxiliary elements 102 are small, low-gain, and have much wider beamwidths than the high-gain antenna. The auxiliary element output signals are multiplied by adaptive weight signals 104 at a weighting network or multiplier 103, combined by an adder 106, and then added to the high-gain antenna output signal by a summer 105.

Figure 11:
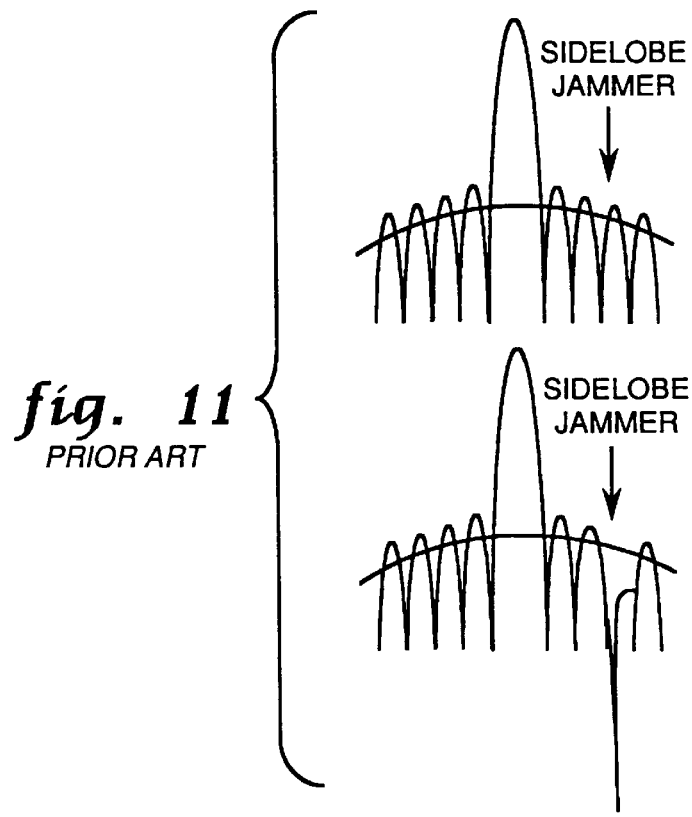
FIG. 11 is a pair of graphs showing sidelobe jammer nulling.
Figure 12:
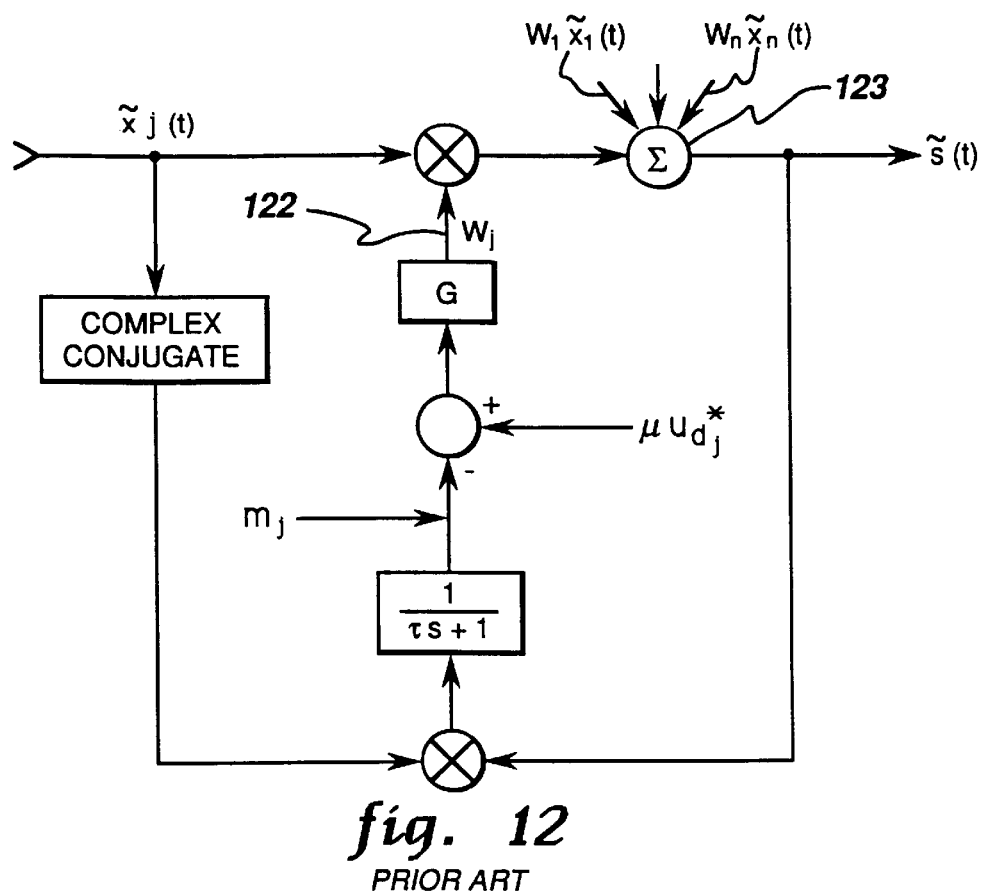
FIG. 12 is a diagram showing the Applebaum feedback loop.

By controlling the weights on the auxiliary elements adaptively, jamming in the sidelobes of the high-gain antenna can be nulled out, as illustrated in FIG. 11. This can be achieved by analog or digital circuitry. For analog implementation at radio frequencies or intermediate frequencies, the weights are adjusted using the so-called Applebaum feedback loop, illustrated in FIG. 12. This implementation requires a feedback loop for each weight and the weight is controlled by the input signal $\tilde{x}_j(t)$ and the error signal at multiplier input 122. The weights will converge to the optimal weight and the jammer is thereby nulled. For the digital implementation, digital samples $r_\Sigma(k)$ for the main array and $r_a(k)$ for the auxiliary array are measured. Cross correlation samples between the main beam and the auxil iary array elements, as well as the auto correlation of the auxiliary elements, are estimated using the samples given by $$r_{\Sigma_a} = \frac{1}{N}\sum_{k=1}^{N} r_\Sigma(k)\underline{r}_a(k) \text{ and} \quad (7)$$

$$r_{aa} = \frac{1}{N}\sum_{k=1}^{N} \underline{r}_a(k)\underline{r}_a^H(k). \quad (8)$$

The adaptive weights for cancelling the jammers are given by $$W = r_{aa}^{-1} r_{\Sigma a} \quad (9)$$

These weights are then downloaded to the weighting network 123 for combining the auxiliary elements.

The target signal can be cancelled whenever 1) the signal enters the auxiliary elements, 2) the signal information is inaccurate, or 3) there is correlation between the desired signal and the interference signal. Constrained adaptation of the auxiliary array can be employed to prevent cancellation of the target signal. Robust methods have been employed to mitigate the effect of inaccurate signal knowledge in the adaptation process (see K. Jablon, "Steady State Analysis of the Generalized Sidelobe Canceler by Adaptive Noise Canceling Techniques," *IEEE Trans. on Antennas and Propagation*, Vol. AP-34, pp. 330-337, March 1986 and H. Cox, R. M. Zeskind and M. M. Owen, "Robust Adaptive Beamforming", *IEEE Trans. on Acoustics, Speech and Signal Processing*, Vol. ASSP-35, pp. 1365-1375, October 1987). Methods for reducing signal cancellation due to correlated jamming have also been suggested recently (see B. Widrow, K. M. Duvall, P. R. Gooch, and W. E. Newman, "Signal Cancellation Phenomena in Adaptive Arrays: Causes and Cures," *IEEE Trans. on Antennas and Propagation*, Vol. AP-30, pp. 469-478, May 1982) and T. Shan and T. Kailath, "Adaptive Beamforming for Coherent Signals and Interference," *IEEE Trans. on Acoustics, Speech and Signal Processing*, Vol. ASSP-33, pp. 527-536, June 1985).

However, the array elements do not have enough gain to cancel the mainlobe jammer (MLJ). Also, noise enters the system if the gain of the auxiliary array is increased.

Sum-Difference Mainlobe Canceller

Figure 7:
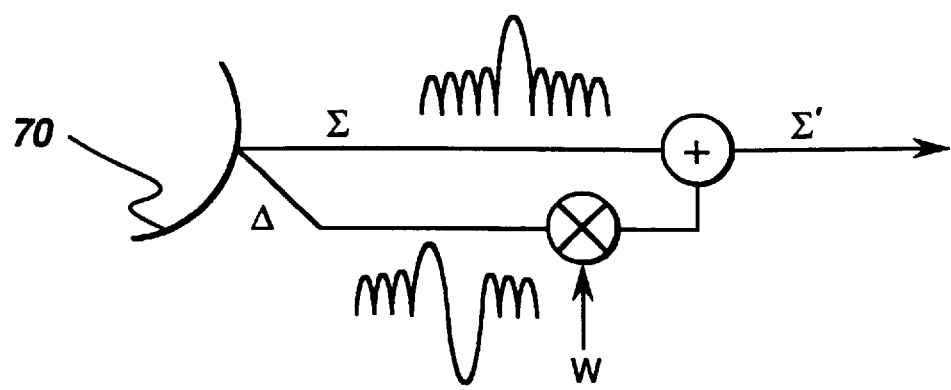
FIG. 7 is a block diagram showing a sum-difference mainlobe canceller.

The sum-difference mainlobe canceller (MLC) is shown in FIG. 7. In the example illustrated, a single parabolic antenna 70 is used to generate the sum ($\Sigma$) and difference ($\Delta$) signals. The high mainlobe gain output signal of the difference beam can be used to null the mainlobe jammer in the sum beam.

Except at the boresight, the difference beam has a high gain and thus can be used for cancelling the mainlobe jammer without introducing excessive noise in the main antenna. Suppose the jammer is at $T_j$, where $T_j$ is the direction cosine of the jammer. The optimal weight for cancelling the jammer is approximately given by $$W = \frac{\Sigma(T_j)}{\Delta(T_j)}. \quad (10)$$

Equation 10 is a very good approximation for large jammer-to-noise ratio. The canceller weight W is actually given by the ratio of the cross-correlation between the sum and difference beam output signals to the auto-correlation of the difference beam output signals. Since $\Sigma$ and $\Delta$ beams have comparable gain within the mainbeam, weight W would be a moderate number. If low gain auxiliary elements are used for mainlobe jamming cancellation, large weights are required for cancelling the jammer in the mainbeam, thus introducing high levels of noise into the system.

S. P. Applebaum et al. in the aforementioned Report DTIC RADC-TR-86-267 expanded on this idea and developed an architecture and algorithm for nulling the mainlobe jammer while preserving the monopulse ratio. The Applebaum et al. technique makes use of the idea that the patterns of the received beam are separable in azimuth and elevation, that is, the patterns can be expressed as products of sum and difference factors in both azimuth and elevation (i.e., $\Sigma = \Sigma_a \Sigma_e$, $\Delta_A = \Delta_a \Sigma_e$, $\Delta_E = \Sigma_a \Delta_e$, $\Delta_\Delta = \Delta_a \Delta_e$).

Figure 8:
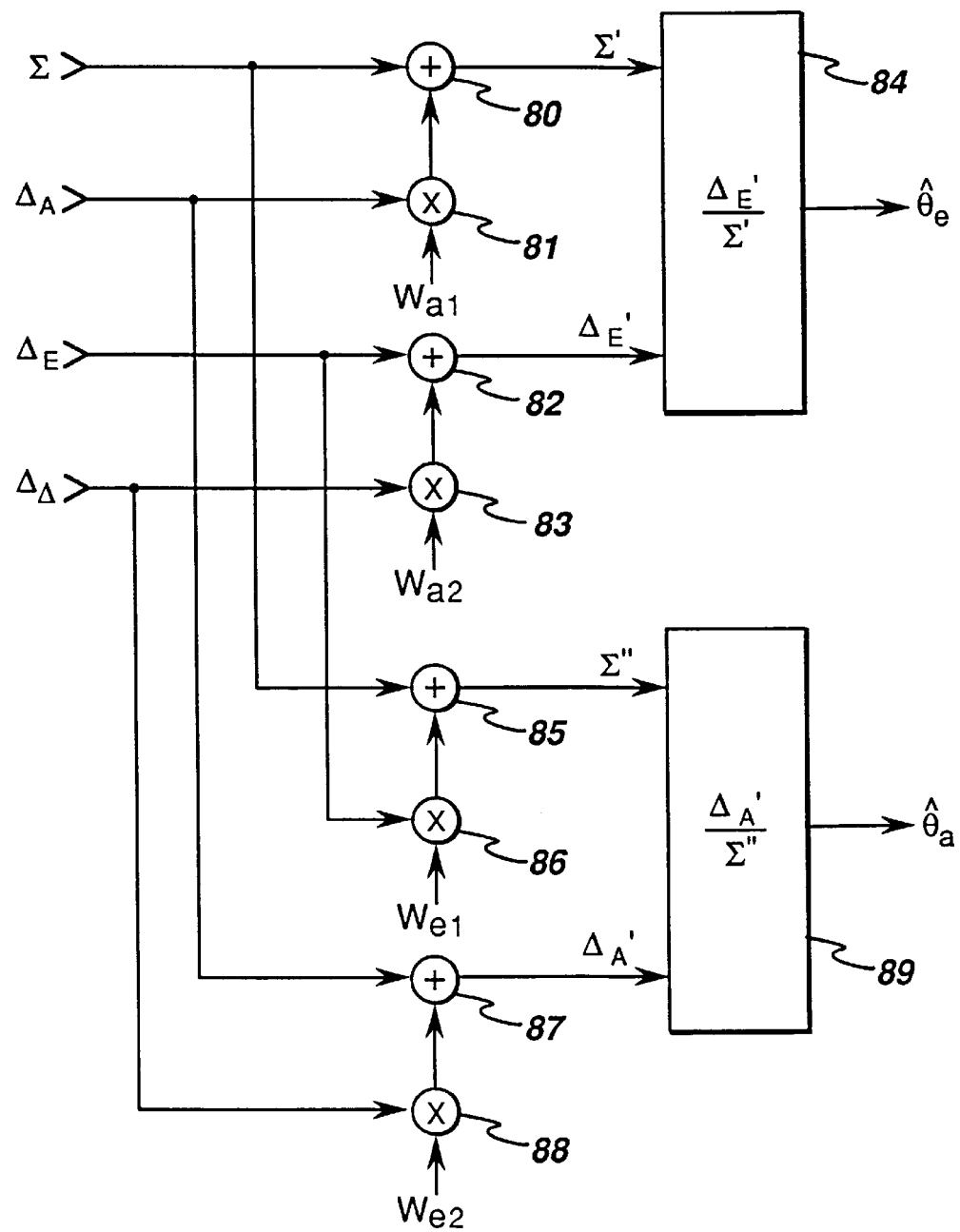
FIG. 8 is a block diagram showing a mainlobe canceller for monopulse processing.

The MLC architecture is shown in FIG. 8. In order to form the monopulse ratio along the elevation, the $\Sigma$ and $\Delta_E$ beams can be adapted by the $\Delta_A$ and $\Delta_\Delta$ beams to form $\Sigma'$ and $\Delta'_E$ beams as follows:

$$\Sigma' = \Sigma - e_{a1}\Delta_A \quad (11)$$

$$\Delta_E' = \Delta_E - W_{a2}\Delta_\Delta, \quad (12)$$

where $W_{a1}$ and $W_{a2}$ are adaptation weights determined as set forth, infra. The adaptation of Equation (11) is implemented with a multiplier 81 and summer 80. Multiplier 81 receives as input signals adaptation weight $W_{a1}$ and the $\Delta_A$ beam, and the product is summed in summer 80 with the $\Sigma$ beam. Similarly, the adaptation of Equation (12) is implemented with a multiplier 83 and summer 82. Multiplier 83 receives as input signals adaptation weight $W_{a2}$ and the $\Delta_\Delta$ beam, and the product is summed in summer 82 with the $\Delta_E$ beam. The output signals of summers 80 and 82, i.e., $\Sigma'$ and $\Delta'_E$, are supplied to a processor 84 which generates the elevation monopulse ratio $\Delta'_E/\Sigma'$.

One mainlobe jammer can be cancelled along the azimuth by choosing the following adaptation weights $W_{a1}$ and $W_{a2}$ to minimize output signals for Equations (11) and (12):

$$W_{a1} = \frac{R_{\Sigma\Delta_A}}{R_{\Delta_A\Delta_\Delta}}, \text{ and} \quad (13)$$

$$W_{a2} = \frac{R_{\Delta_E\Delta_A}}{R_{\Delta_\Delta\Delta_\Delta}}, \quad (14)$$

where $$R_{\Sigma\Delta_A} = E[\Sigma\Delta_A^*],$$

$$R_{\Delta_A\Delta_A} = E[\Delta_A\Delta_A^*],$$

$$R_{\Delta_E\Delta_\Delta} = E[\Delta_E\Delta_\Delta^*], \text{ and}$$

$$R_{\Delta_\Delta\Delta_\Delta} = E[\Delta_\Delta\Delta_\Delta^*], \quad (15)$$

where $\Delta_A^*$ is the complex conjugate of $\Delta_A$ and $\Delta_\Delta^*$ is the complex conjugate of $\Delta_\Delta$. (The symbol * represents the complex conjugate.) $W_{a1}$ should be equal to $W_{a2}$ analytically. In practice, however, $W_{a1}$ may not be equal to $W_{a2}$, as the weights are determined by data samples. In that case, we may force them to be equal (e.g., adapt $W_a$ in the $\Sigma$ channel and use it in the $\Delta$ channel or vice versa, or set $$W_a = \frac{W_{a1} + W_{a2}}{2}\bigg).$$

The monopulse ratio along the elevation $f_e(\theta_e)$, where $f_e$ is the ratio of $\Delta_E'$ to $\Sigma'$, is obtained in processor 84 by the following:

$$f_e(\theta_e) = \frac{\Delta_E'}{\Sigma'} = \frac{\Delta_E - W_a \Delta_\Delta}{\Sigma - W_a \Delta_A} \quad (16)$$

$$= \frac{\Sigma_a \Delta_e - W_a \Delta_a \Delta_e}{\Sigma_a \Sigma_e - W_a \Delta_a \Sigma_e}$$

$$= \frac{\Delta_e (\Sigma_a - W_a \Delta_a)}{\Sigma_e (\Sigma_a - W_a \Delta_a)}$$

$$= \frac{\Delta_e}{\Sigma_e}.$$

Thus, the monopulse ratio for the elevation angle $\theta_e$ estimation is maintained (except at the azimuth angle where there is a jammer), and the mainlobe jammer is cancelled.

Cancellation of the mainlobe jammer and maintaining the monopulse ratio along the azimuth direction can be developed in a similar manner. The adapted sum and difference beams $\Sigma''$ and $\Delta_A'$, respectively, are given by $$\Sigma'' = \Sigma - W_{e1} \Delta_E, \text{ and} \quad (17)$$

$$\Delta_A' = \Delta_A - W_{e2} \Delta_\Delta, \quad (18)$$

where $W_{e1}$ and $W_{e2}$ are adaptation weights determined as set forth, infra. The adaptation of Equation (17) is implemented with a multiplier 86 and summer 85. Multiplier 86 receives as input signals adaptation weight $W_{e1}$ and the $\Delta_E$ beam, and the product is summed in summer 85 with the $\Sigma$ beam. Similarly, the adaptation of Equation (18) is implemented with a multiplier 88 and summer 87. Multiplier 88 receives as input signals adaptation weight $W_{e2}$ and the $\Delta_A$ beam, and the product is summed in summer 87 with the $\Delta_A$ beam. The output signals of summers 85 and 87, i.e., $\Sigma''$ and $\Delta_A'$, are supplied to a processor 89 which generates the azimuth monopulse ratio $\Delta_A'/\Sigma''$.

The mainlobe jammer can be cancelled by choosing the following adaptive weights:

$$W_{e1} = \frac{R_{\Sigma \Delta_E}}{R_{\Delta_E \Delta_E}}, \text{ and} \quad (19)$$

$$W_{e2} = \frac{R_{\Delta_A \Delta_\Delta}}{R_{\Delta_\Delta \Delta_\Delta}}. \quad (20)$$

Similarly, the weights can be set equal (e.g., $W_e = W_{e1} + W_{e2}/2$), where $$R_{\Sigma \Delta_E} = E[\Sigma \Delta_E^*]$$

$$R_{\Delta_E \Delta_E} = E[\Delta_E \Delta_E^*] \text{ and}$$

$$R_{\Delta_A \Delta_\Delta} = E[\Delta_A \Delta_A^*].$$

The monopulse ratio for azimuth angle $\theta_a$ estimation can then be shown to be preserved:

$$f_a(\theta_a) = \frac{\Delta_A'}{\Sigma''} = \frac{\Delta_A - W_e \Delta_\Delta}{\Sigma - W_e \Delta_E} \quad (21)$$

$$= \frac{\Delta_a}{\Sigma_a}.$$

Adaptive Array

Adaptive receiving arrays for radar, which maximize the signal-to-noise ratio at the array output, were first developed by S. P. Applebaum, see Report SPL-769, supra. These arrays maximize the ratio of antenna gain in a specified scan direction to the total noise in the output signal. Similar techniques have been described for communications systems by Widrow et al., supra, which minimize the mean square error between the array output signal and a transmitted pilot signal which is known a priori at the receiver. The theory of adaptive arrays as applied to the angle measurement problem has been developed by R. C. Davis, L. E. Brennan and I. S. Reed, "Angle Estimation with Adaptive Arrays in External Noise Field," *IEEE Trans. on Aerospace and Electronic Systems*, Vol. AES-12, No. 2, March 1976. The Davis et al. analysis of using maximum likelihood theory of angle estimation leads naturally to the adaptive sum and difference beams.

Figure 9:
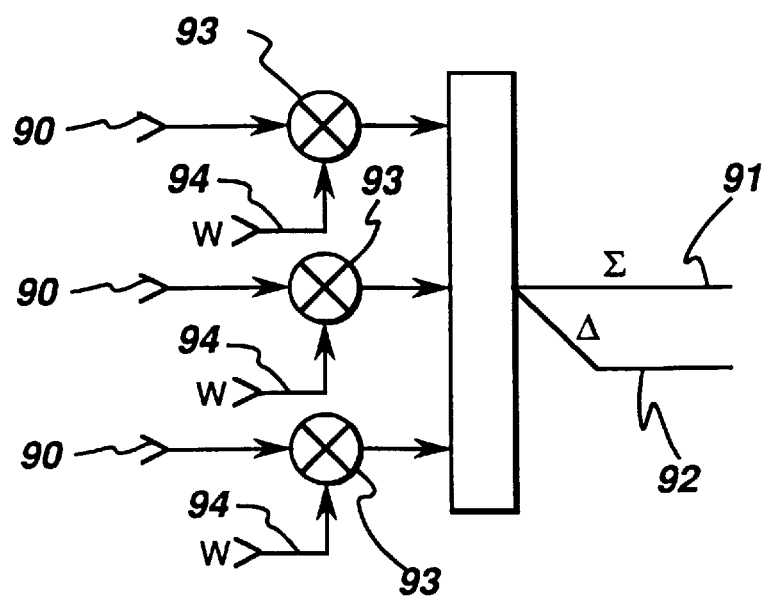
FIG. 9 is a block diagram showing an adaptive array for forming sum and difference beam output signals.

The array architecture is shown in FIG. 9. The sum and difference beams, represented by the symbols $\Sigma$ and $\Delta$, respectively, at array outputs 91 and 92, respectively, are formed by adaptive receiving array techniques which serve to null the interference sources. Because of the adaptivity, which involves using multipliers 93 to apply an adaptive weight at multiplier inputs 94 to antenna array signals furnished at multiplier inputs 90, the two patterns vary with the external noise field and are distorted relative to the conventional monopulse sum and difference beams which possess even and odd symmetry, respectively, about a prescribed boresight angle. The adaptive weights for the sum and difference beams are given by $$\hat{W}_\Sigma = R^{-1} W_\Sigma, \text{ and} \quad (22)$$

$$\hat{W}_\Delta = R^{-1} W_\Delta, \quad (23)$$

where $W_\Sigma$ and $W_\Delta$ are the nominal sum and difference weights used in a conventional monopulse system and R is the covariance matrix of the total interference, which may include jamming and noise. R can be estimated by ensemble averaging the outer-product of the data samples obtained within the observation interval. The antenna patterns are distorted according to the following expressions, where S represents the target signal array response vector:

$$\hat{\Sigma}(\theta) = \hat{W}_\Sigma^H S \quad (24)$$

$$= W_\Sigma^H R^{-1} S, \text{ and}$$

$$\hat{\Delta}(\theta) = \hat{W}_\Delta^H S \quad (25)$$

$$= W_\Delta^H R^{-1} S.$$

The resulting monopulse ratio is distorted and equal to $$f'(\theta) = Re\left(\frac{\hat{\Delta}(\theta)}{\hat{\Sigma}(\theta)}\right) \quad (26)$$

$$= Re\left(\frac{W_\Delta^H R^{-1} S}{W_\Sigma^H R^{-1} S}\right),$$

where $R_e$ signifies the real part of the expression, and the ideal monopulse ratio is $$f(\theta) = Re\left(\frac{W_\Delta^H S}{W_\Sigma^H S}\right). \quad (27)$$

This technique cancels both the mainlobe and sidelobe jammers but distorts the monopulse ratio. This approach for DOA estimation has been verified by computer simulation to work well for SLJs, but performance degrades when the jammers are within the mainbeam.

Techniques for simultaneous nulling in the sum and difference channels of a monopulsed phased array using one set of adaptive weights shared by both beams can be found in L. Haupt, "Simultaneous Nulling in the Sum and Difference Patterns of a Monopulse Antenna," *IEEE Trans. on Antennas and Propagation*, Vol. Ap-32, No. 5, May 1984, pp. 486-493, L. Haupt, "Adaptive Nulling in Monopulse Antennas," *IEEE Trans. on Antennas and Propagation*, Vol. 36, No. 2, February 1988, pp. 202-208, and B. Vu, "Simultaneous Nulling in Sum and Difference Patterns by Amplitude Control," *IEEE Trans. on Antennas and Propagation*, Vol. 34, No. 2, February 1986. It should be noted that nulls may be inserted in the two patterns by using separate adaptive weights and controls for the sum and difference channels. However, this would require two sets of adaptive beamforming hardware. Moreover, inserting a null in the sum pattern does not automatically insert a null in the difference pattern and vice versa. Thus, attempts to adapt the beams separately to null the jammers will cancel the jammers but will also distort the monopulse ratio, thus impairing its usefulness for DOA estimation. Monopulse processing for DOA estimation requires simultaneous adaptation of the sum and difference beams.

Mulitple Sidelobe Canceller Followed by a Mainlobe Canceller

Figure 13:
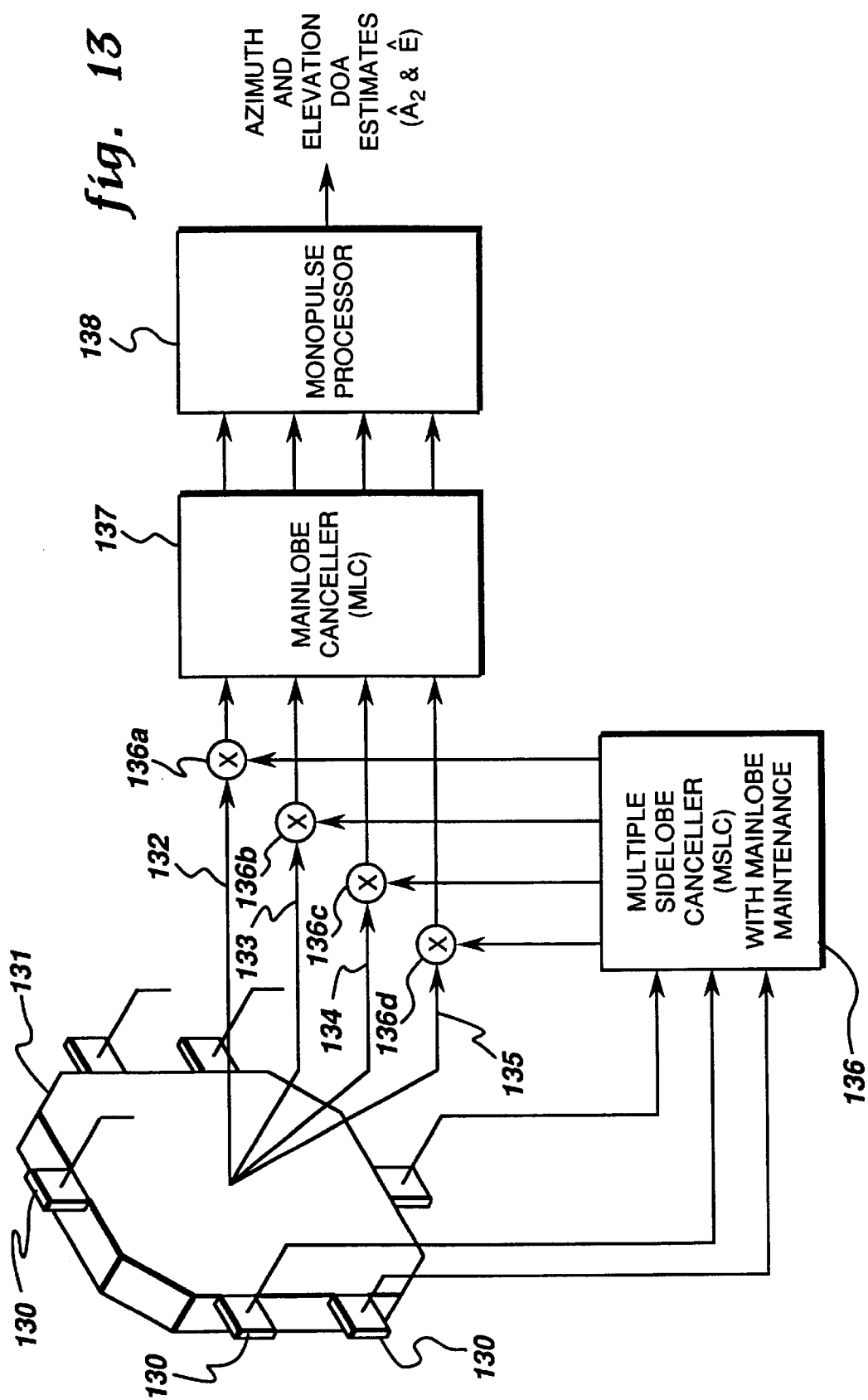
FIG. 13 is a block diagram of the architecture of the invention, combining a multiple sidelobe canceller and mainlobe canceller for monopulse processing.

FIG. 13 shows a multiple sidelobe canceller 136 cascaded with a mainlobe canceller 137 for monopulse processing by a monopulse processor 138. The main beam voltage measurements for the main antenna array 131 are given by $$r_\Sigma = \sum (T_x^s, T_y^s)S + \sum_{k=1}^{K} \sum (T_x^k, T_y^k)J_k + n_\Sigma \quad (28)$$

$$r_{\Delta_A} = \Delta_A(T_x^s, T_y^s)S + \sum_{k=1}^{K} \Delta_A(T_x^k, T_y^k)J_k + n_{\Delta_A}$$

$$r_{\Delta_E} = \Delta_E(T_x^s, T_y^s)S + \sum_{k=1}^{K} \Delta_E(T_x^k, T_y^k)J_k + n_{\Delta_E}$$

$$r_{\Delta_\Delta} = \Delta_\Delta(T_x^s, T_y^s)S + \sum_{k=1}^{K} \Delta_\Delta(T_x^k, T_y^k)J_k + n_{\Delta_\Delta},$$

where $\Sigma$, $\Delta_A$, $\Delta_E$, and $\Delta_\Delta$ are the respective sum and difference values for the main antenna patterns, and appear on channels 132, 133, 134 and 135, respectively, while k represents the $k^{th}$ jammer signal. Pattern $\Sigma$ has a symmetrical profile with respect to both the azimuth and elevation with maximum gain at the boresight. Output signals from multiple sidelobe canceller MSLC 136 are subtracted from patterns $\Sigma$, $\Delta_A$, $\Delta_E$ and $\Delta_\Delta$ in summers 136a, 136b, 136c and 136d, respectively, so as to modify those patterns such that sidelobe jamming is removed. Pattern $\Delta_A$ has a symmetrical profile with respect to the elevation but is antisymmetrical with respect to the azimuth. Pattern $\Delta_E$ is symmetrical with respect to the azimuth but is antisymmetrical with respect to the elevation. Pattern $\Delta_\Delta$ is antisymmetrical with respect to both axes and has a zero response at the boresight. S and $\{J_k\}$ represent the signal and jamming vectors, respectively, while $n_\Sigma$, $n_{\Delta_A}$, $n_{\Delta_E}$, and $n_{\Delta_\Delta}$ are the measurement noise. The voltage measurements $\{r_{a_1}\}$ for the auxiliary antenna array, which is comprised of elements 130, are given by $$(r_{a_1}) = G_{a_1}(T_x^s, T_y^s)S + \sum_{k=1}^{K} G_{a_1}(T_x^k, T_y^k)J_k + n_{a_1} \quad 1 = 1, 2, \ldots, N, \quad (29)$$

where $\{G_{a_1}\}$ are the elemental gains; $\{n_{a_1}\}$ are the elemental noise; $r_{a_1}$ are used for SLJ cancellation; and $r_\Sigma$, $r_{\Delta_A}$, $r_{\Delta_E}$, and $r_{\Delta_\Delta}$ are used for target detection and angle estimation using monopulse processing.

When there is no jamming and noise, the target angle estimation procedure can be derived by noting that the patterns are separable in azimuth and elevation. They can be expressed as the following product factors:

$$\Sigma(T_x,T_y)=\Sigma_a(T_x)\Sigma_e(T_y)$$

$$\Delta_A(T_x,T_y)=\Delta_a(T_x)\Sigma_e(T_y)$$

$$\Delta_E(T_x,T_y)=\Sigma_a(T_x)\Delta_e(T_y)$$

$$\Delta_\Delta(T_x,T_y)=\Delta_a(T_x)\Delta_e(T_y). \quad (30)$$

The target DOA can be obtained exactly as $$f_a(\theta_a) = \frac{\Delta_A(T_x, T_y)}{\Sigma (T_x, T_y)} \quad (31)$$

$$= \frac{\Delta_a(T_x)}{\Sigma_a(T_x)} \text{ and}$$

$$f_e(\theta_e) = \frac{\Delta_E(T_x, T_y)}{\Sigma (T_x, T_y)} \quad (32)$$

$$= \frac{\Delta_e(T_x)}{\Sigma_e(T_x)}.$$

In the presence of jamming, cancellation techniques can be applied before measurements are used for monopulse processing. The SLJs can be cancelled using input signals from the array of auxiliary elements 130. Consider the following adaptive main beam output signals:

$$r_\Sigma' = r_\Sigma - W_\Sigma^H r_a \quad (33)$$

$$r_{\Delta_A}' = r_{\Delta_A} - W_{\Delta_A}^H r_a$$

$$r_{\Delta_E}' = r_{\Delta_E} - W_{\Delta_E}^H r_a$$

$$r_{\Delta_\Delta}' = r_{\Delta_\Delta} - W_{\Delta_\Delta}^H r_a.$$

Figure 14:
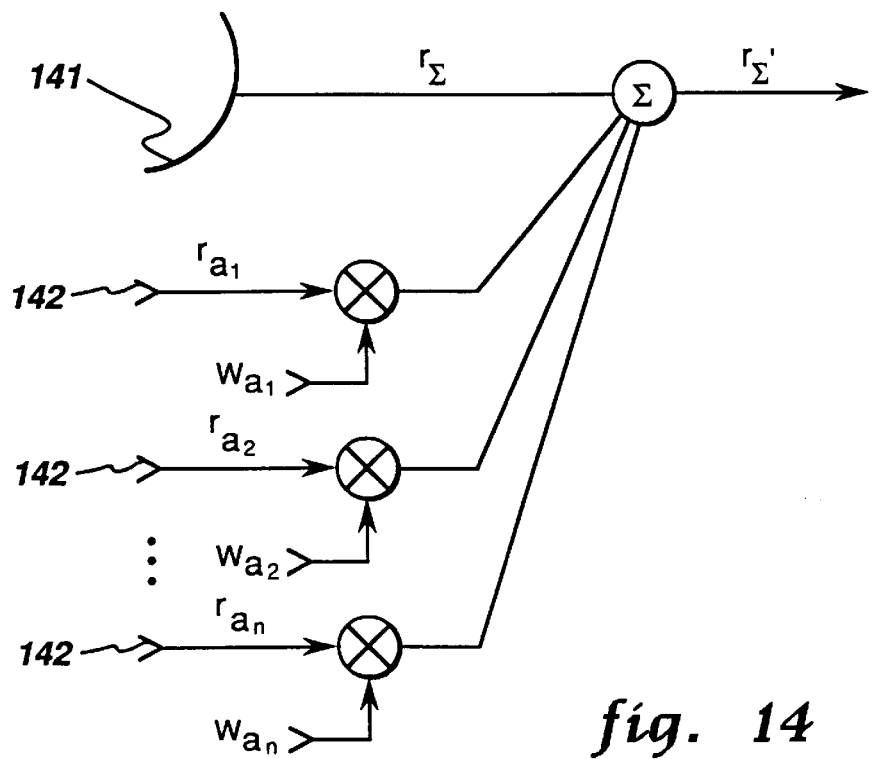
FIG. 14 is a diagram showing mainlobe maintenance in conjunction with a multiple sidelobe canceller.

The optimal weights for minimizing the interference output signal for each of the main beams are given by $$W_\Sigma = \hat{R}_{aa}^{-1} \hat{R}_{a\Sigma} \quad (34)$$

$$W_{\Delta_A} = \hat{R}_{aa}^{-1} \hat{R}_{a\Delta_A}$$

$$W_{\Delta_E} = \hat{E}_{aa}^{-1} \hat{R}_{a\Delta_E}$$

$$W_{\Delta_\Delta} = \hat{R}_{aa}^{-1} \hat{R}_{a\Delta_\Delta}$$

where an appropriate mainlobe maintenance or a constrained adaptive procedure is imposed. For example, this can be achieved by measuring the mainlobe jammer contribution in the covariance matrix estimation. This procedure is illustrated in FIG. 14. The voltage measurement model for the signal at the main antenna 141 and the signal at the auxiliary antenna elements 142 is given by:

$$r_\Sigma = \sum_{k=1}^{K} g_\Sigma(T_J^k) J_k + n_\Sigma \text{ and} \tag{35}$$

$$\underline{r_a} = \sum_{k=1}^{K} \underline{g_a}(T_J^K) J_k + \underline{n_a} \tag{36}$$

while the covariance matrix and cross-correlation matrix are given by $$R_{aa} = \sum_{k=1}^{K} \underline{g_a}(T_J^k) \underline{g_a}^H(T_J^k) P_k + \sigma^2 I \tag{37}$$

$$R_{a\Sigma} = \sum_{k=1}^{K} \underline{g_a}(T_J^K) g_\Sigma^a(T_J^k) P_k, \tag{38}$$

where $P_k$ is the power representation of the $k^{th}$ jammer, $\sigma^2$ is the noise power and I is the identity matrix. $R_{aa}$ can be analyzed to obtain an estimate of the jammer angle and power. Specifically, the eigenvalue decomposition of $R_{aa}$ is given as $$R_{aa} = \sum_{i=1}^{N} \lambda_i \underline{q_i q_i^H} \tag{39}$$

where $\lambda_i$, $q_i$ are the eigenvalue-eigenvector pairs. If there are K jammers, K of the eigenvalues should be significant with respect to the rest, and the noise subspace $E_N = [q_{k+1} \ldots q_N]$ should be orthogonal to the jammer manifold, i.e.

$$E_N^H g_a(T_J) = 0 \tag{40}$$

The above equation 40 can be solved for a set of jammer angles $\{T_J\}$. One of them is within the mainbeam (if there is a mainlobe jammer). Let the directional cosine of the DOA of the mainlobe jammer be $T_l$. The power of the mainlobe jammer can then be solved by equating the jammer part of the covariance matrix and the power representation, i.e., $$\sum_{k=1}^{K} \underline{g_a^{(k)} g_a^{(k)H}} P_k = \sum_{k=1}^{K} (\lambda_k - \sigma^2) \underline{q_k^H q_k^H}. \tag{41}$$

It should be noted that $g_a^{(k)} = g_a(T_J^K)$ is used for convenience. $P_k$ can be solved by using the following set of linear equations:

$$\lambda_1 - \sigma^2 = \sum_{k=1}^{K} (g_1^H g_a^{(k)})(g_a^H g_1) P_k \quad 1 = 1, 2, \ldots K. \tag{42}$$

Then the jammer response vector $g_a^{(k)}$ and the power $P_k$ can be determined for each of the K jammers. If one of the jammers is within the mainbeam, it can be removed from the covariance matrix expression, that is, the modified covariance matrix and cross-correlation matrix are then given by:

$$\hat{R}_{aa} = R_{aa} - P_1 g_a^{(1)} g_a^{(1)H} \tag{43}$$

$$\hat{R}_{a\Sigma} = R_{a\Sigma} - P_1 g_a^{(1)} g_\Sigma^*.$$

The modified covariance matrices can then be used for adaptive weight computations as before.

Another mainlobe maintenance procedure is to spatially filter out the mainlobe jammer in the auxiliary array. This procedure involves modifying the system of FIG. 13 in the manner shown in FIG. 13A; i.e., by constructing a blocking matrix B such that the mainlobe jammer is filtered out of the signals supplied by the auxiliary array. If $$r_a' = B r_a, \tag{44}$$

B has the property of nulling out the mainlobe jammers, i.e., $$B g_a(T_j) = 0 \tag{45}$$

The spatial filtered samples can then be used for covariance matrix estimation and adaptive weight computation.

The main channel output signals are thus freed of SLJ but may include MLJ. The MLJ cancellation technique can be applied as before, leading to the following:

$$r_{\Sigma_E}'' = r_\Sigma' - W_{a_1} r_{\Delta_A}'$$

$$r_{\Delta_E}'' = r_{\Delta_E}' - W_{a_2} r_{\Delta_A}'$$

$$r_{\Sigma_A}'' = r_\Sigma' - W_{e_1} r_{\Delta_g}'$$

$$r_{\Delta_A}'' = r_{\Delta_A}' - W_{e_2} r_{\Delta_A}'. \tag{46}$$

The optimal weights for suppressing the MLJ can be derived to be $$W_{a_1} = \frac{E[r_{\Sigma'} r_{\Delta_{A'}}^*]}{E[r_{\Delta_{A'}} r_{\Delta_{A'}}^*]} \tag{47}$$

$$W_{a_2} = \frac{E[r_{\Delta_{E'}} r_{\Delta_\Delta}^{\prime*}]}{E[r_{\Delta_\Delta}' r_{\Delta_\Delta}^{\prime*}]}$$

$$W_{e_1} = \frac{E[r_\Sigma' r_{\Delta_E}^{\prime*}]}{E[r_{\Delta_E}' r_{\Delta_E}^{\prime*}]}$$

$$W_{e_2} = \frac{E[r_{\Delta_A}' r_{\Delta_\Delta}^{\prime*}]}{E[r_{\Delta_\Delta}' r_{\Delta_\Delta}^{\prime*}]}.$$

In order to evaluate performance of the technique, the antenna patterns and the monopulse ratio are derived. The antenna patterns are the response due to the testing signal and are given by $$\Sigma_E'' = (\Sigma S - W_{a_1} \Delta_A S) - (\hat{W}_\Sigma^H - W_{a_1} \hat{W}_{\Delta_A}^H) G_a S$$

$$= (\Sigma S - W_{a_1} \Delta_A S)$$

$$\Delta_E'' (\Delta_E S - W_{a_2} \Delta_A S)$$

$$\Sigma_A'' = (\Sigma S - W_{e_1} \Delta_E S)$$

$$\Delta_A'' (\Delta_A S - W_{e_2} \Delta_A S). \tag{48}$$

In each case, input signals from the auxiliary array are negligible as the auxiliary array gains are very much lower than the main antenna gains. The monopulse ratios for the elevation and azimuth angle estimation are given by $$f_e'(\theta_e) = Re\left\{\frac{\Delta_E S - W_{a_2} \Delta_\Delta S}{\Sigma S - W_{a_1} \Delta_\Delta S}\right\} \tag{50}$$

$$= Re\left\{\frac{\Sigma_a(T_x^s) \Delta_e(T_y^s) - W_{a_2} \Delta_a(T_x^s) \Delta_e(T_y^s)}{\Sigma_a(T_x^s) \Sigma_e(T_y^s) - W_{a_1} \Delta_\Delta(T_x^s) \Delta_e(T_y^s)}\right\}$$

-continued $$= Re\left\{\frac{\Delta_e(T_y^s)(\Sigma_a(T_x^s) - W_{a_2}\Delta_a(T_x^s))}{\Sigma_e(T_y^s)(\Sigma_a(T_x^s) - W_{a_1}\Delta_a(T_x^s))}\right\}$$

$$= \frac{\Delta_e(T_y^s)}{\Sigma_e(T_y^s)} \text{ (if } W_{a_1} = W_{a_2}\text{) and}$$

$$f'_a(\theta_a) = Re\left\{\frac{\Delta_A S - W_{e_2}\Delta_\Delta S}{\Sigma S - W_{e_1}\Delta_\Delta S}\right\}$$

$$= \frac{\Delta_a(T_x^s)(\Sigma_e(T_y^s) - W_{e_2}\Delta_e(T_y^s))}{\Sigma_a(T_x^s)(\Sigma_e(T_y^s) - W_{e_1}\Delta_e(T_y^s))}$$

$$= \frac{\Delta_a(T_x^s)}{\Sigma_a(T_x^s)} \text{ (if } W_{e_1} = W_{e_2}\text{).}$$

Thus monopulse ratios are preserved, and jamming is cancelled.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. In a monopulse radar system for receiving, at a high-gain main antenna coupled to a receiver, a received signal which may be made up of a target signal, a mainlobe jammer signal, sidelobe jammer signals, and noise, said system further including an auxiliary array of low-gain sensor elements, a monopulse processor for determining angle of arrival from formed sum and difference beams in the receiver, a sidelobe canceller, and a mainlobe canceller for generating said sum and difference beams which are expressed as a product of elevation and azimuth factors for use by said monopulse processor, said system simultaneously yielding an undistorted elevation angular measurement by cancelling a mainlobe jammer with nulls in azimuth and an undistorted azimuth angular measurement by cancelling said mainlobe jammer with nulls in elevation, the method of operation comprising the steps of:

nulling jammers in the sidelobes of said main antenna by adaptively weighting output signals of said auxiliary array in accordance with a covariance matrix expression and adding said weighted output signals to signals from said main antenna prior to processing by said mainlobe canceller;

maintaining the mainlobe during said nulling; and cascading said multiple sidelobe canceller with said mainlobe canceller.

2. The method of claim 1 wherein the step of maintaining the mainlobe during said nulling comprises removing the mainlobe jammer contribution from the adaptive weighting applied to output signals of said auxiliary array.

3. The method of claim 1 wherein the step of maintaining the mainlobe during said nulling comprises constructing a blocking matrix to spatially filter out the mainlobe jammer in the auxiliary array.

4. In a monopulse radar system having a high-gain main antenna coupled to a receiver, an auxiliary array of low-gain sensor elements, a mainlobe canceller, and a monopulse processor for determining angle of arrival, said monopulse processor being operable to provide an angle of arrival estimate from sum and difference beams in the receiver, and said mainlobe canceller being operable to generate said sum and difference beams which are expressed as a product of elevation and azimuth factors for use by said monopulse processor to simultaneously yield an undistorted elevation angular measurement by cancelling a mainlobe jammer with nulls in azimuth and an undistorted azimuth angular measurement by cancelling said mainlobe jammer with nulls in elevation, the improvement comprising:

means for nulling jammers in the sidelobes of said main antenna by adaptively weighting output signals of said auxiliary array in accordance with a covariance matrix expression and adding said weighted output signals to signals from said high gain antenna prior to processing by said 20 mainlobe canceller;

means for maintaining the mainlobe while nulling said jammers in the sidelobes of said main antenna; and means for cascading said multiple sidelobe canceller with said mainlobe canceller.

5. The improvement of claim 4 wherein said means for maintaining the mainlobe comprises means for removing the mainlobe jammer contribution from the covariance matrix expression used for said adaptive weighting.

6. The improvement of claim 4 wherein said means for maintaining the mainlobe comprises means for performing a constrained adaptive procedure, said adaptive procedure being to construct a blocking matrix to spatially filter out the mainlobe jammer in the auxiliary array.

* * * * *